July 21, 1953 A. N. GOLDSMITH 2,645,976

SUBTRACTIVE COLOR TELEVISION

Filed Aug. 5, 1949 3 Sheets-Sheet 1

INVENTOR
Alfred N. Goldsmith
BY
[signature]
ATTORNEY

July 21, 1953 A. N. GOLDSMITH 2,645,976

SUBTRACTIVE COLOR TELEVISION

Filed Aug. 5, 1949 3 Sheets-Sheet 2

INVENTOR
Alfred N. Goldsmith
BY
ATTORNEY

INVENTOR
Alfred N. Goldsmith
BY Philip G. Cooper
ATTORNEY

Patented July 21, 1953

2,645,976

UNITED STATES PATENT OFFICE 2,645,976

SUBTRACTIVE COLOR TELEVISION

Alfred N. Goldsmith, New York, N. Y., assignor to Radio Corporation of America, a corporation of Delaware Application August 5, 1949, Serial No. 108,822

5 Claims. (Cl. 88—61)

My present invention relates to television systems and in particular to color television systems.

In general, there are two types of color television systems, the additive and the subtractive types. In subtractive color television white light is passed successively through two or more component or primary color valves or light-beam modifying and controlling devices which have color absorptive characteristics whereby the light after passage through the final light valve retains that portion of the spectral band required to give a desired color. As an example, one may use three such valves, each transmitting in accordance with appropriate and corresponding electrical signals controlling the spectral absorption of each valve at each point of the area thereof in accordance with a color image to be formed. The transmitted colors of the respective valves may be referred to as cyan, magenta, and xanth. Cyan is a bluish-green color, substantially the white spectrum minus red. Magenta is a bluish-red color, substantially the white spectrum minus green. Xanth is a yellow color, which is substantially the white spectrum minus blue. Each of the image forming elements or valves transmits so much of its respective color as is needed to form the correct color at each point in the final image. Thus the final image is reproduced in colors of acceptable accuracy which are actually present, and need not depend upon the retinal stimulations and the psychological processes of the observer for a simulated color effect, as is the case in additive color systems. In a subtractive color system, if each elemental area of each light screen or primary color valve transmits so much of the respective component color as is to appear in a corresponding elemental area of the final image or as will coact optically and correctly in the color-forming process with the other corresponding primary color elemental areas homologous in position with the first-mentioned area, and if the light from each elemental area passes through the corresponding or homologous elemental area of each of the other light valves, the light after transmission through these valves being directly viewed, or focused, or thrown upon a viewing screen or viewed through a lens, the observer will see an image colored in the same fashion as the original image. In brief, each valve subtracts from white so much of its particular color as must be excluded from the final image to give a true color image, and all the valves collectively thus reproduce the original image colors.

The optical veracity or image accuracy of the observed image is dependent upon various factors, important among which are the optical alignment of the homologous elemental areas of the respective valves and the physical conformance of the light transmission characteristics of each control valve to those transmission characteristics which will give theoretically perfect results. Subtractive color television has certain advantages over additive color television, the most important of which at present appears to be that there is a possibility of greater optical efficiency whereby a very bright picture may be produced by efficient known light sources of large normal luminous output, and without dependency upon the fluorescence of a cathode ray tube screen which is a relatively costly source of light of limited practicable amount.

The development of subtractive color television has been greatly hampered by the lack of suitable light valves providing the desired transmission characteristics. Light valves have been proposed heretofore, for example, of expensive crystalline material, difficult to construct, and the light transmissive or absorptive characteristics of which afford only a limited choice or a limited range not conforming closely to the theoretically perfect range of accurate proportionality from complete transmission to complete absorption. Further, such valves have not been capable of sufficiently rapid changes in their absorptive and image forming capabilities. These prior valves have not, therefore, been practically employed in constructing a color television receiver.

It is an object of the present invention to provide an improved subtractive color television light valve.

It is another object of the invention to provide a light valve for subtractive color picture reproducers which is characterized by ready and rapid response to electronic control means.

It is another object of the present invention to provide a light valve for subtractive color television which may be readily constructed and is comparatively inexpensive.

Another object of the present invention is to provide an improved color television system.

A further object of the invention is to provide a method for the construction of a light transmissive color television light valve.

A still further object is to provide a light valve which affords a wide choice of the color transmissive characteristics thereof.

A further object of the invention is to provide a novel particle for use in a color television light valve.

In accordance with the invention, the valve of my improved subtractive color television system or picture reproducer includes a liquid suspension of flake or plate-like particles which are aligned by an electric field to transmit through the suspension substantially all light of a broad spectrum, preferably the spectrum of white light, and the flakes are de-oriented, that is, oriented at random in the absence of an electric field to have the flakes, which are chromatically colored, selectively absorb light of a desired fractional portion of the broad spectrum. The flakes or plate-like particles are more or less aligned depending on the electric field imposed at each elemental image or picture area of the light valve. This field may be controlled by picture video signals which vary an electron beam at an elemental area of the valve in accordance with the corresponding color or color spectrum to be absorbed thereby to transmit the desired color to the corresponding elemental area of the image to be produced.

According to another feature of the invention the flakes, or particles in suspension in the valve liquid, are plate-like particles made of a material substantially transparent, say, to white light, each flake being colored or dyed or coated so as to be absorptive of the desired fractional spectrum or frequency range of white light to be subtracted therefrom to give a desired subtractive color, and having a dielectric constant greater than that of the immersing liquid, and preferably being provided with controllable surface conduction.

I am aware of certain light valves proposed for black and white television; for example, those proposed in an article in Proceedings of the Institute of Radio Engineers, vol. 31, May 1943, pages 195 etc. However, these valves in the described form are suitable for black-and-white television, and not for color television because they are not chromatically color selective. My present invention is an improvement on the light control valves described in the said article, and with the valves of my invention I provide a new color television system having many desirable features.

Further objects, novel features, and advantages of the invention will become apparent from the following description and the accompanying drawing, in which.

Figures 1, 2, 3:
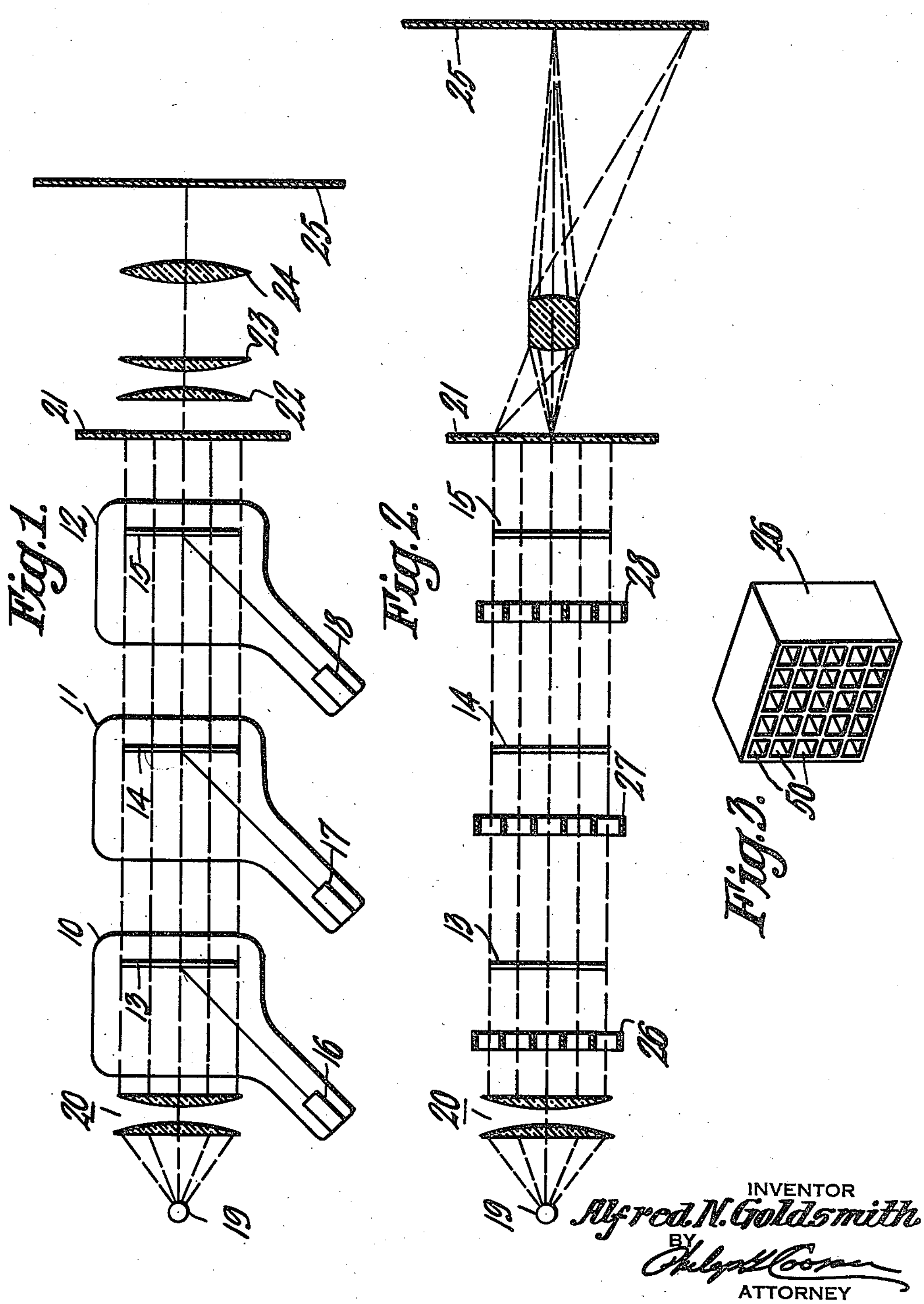
Figure 1 is a cross-sectional schematic view of a subtractive color television system or picture reproducer according to the invention.
Figure 2 is a cross-sectional view of a second form of subtractive color television system.
Figure 3 is a perspective view, greatly enlarged, of a collimating device to be utilized between the light valves as indicated by Figure 2.

Figure 1 shows three picture tubes 10, 11 and 12 having the color control valves 13, 14 and 15, respectively. The valves 13, 14 and 15 each have an associated electron gun 16, 17 or 18. Each electron gun is adapted to direct a beam of focused electrons on its corresponding valve. Appropriate deflection means, not specifically illustrated, cause the electron beam to scan the valve surface in well-known fashion. The beam is modulated to control the passage of light through the elemental areas of the valve at the point of impingement of the beam, as will appear more fully hereinafter. Although the color television receiver of Figure 1 utilizes three color control valves which respectively correspond to transmission of the colors cyan, magenta and xanth, it is well known that, in subtractive color television schemes, it is possible to use a two-color method, e. g., using orange-red and green-blue component colors as well as a tri-color method. It should accordingly be understood that the invention is applicable to bi-color, tri-color, quadri-color, key-image and other analogous television systems.

A light source 19 has rays of light emanating therefrom collimated, for example, by lens system 20, and the collimated light is passed successively through the three-color control valves. The source 19 may be a line source or a point source, the lens system being accordingly cylindrical or spherical according to well-known optical methods. The picture produced by operation of the valves 13, 14 and 15 may be viewed on a screen 21 or may be projected through a converging projection lens system 22, 23, 24 to a viewing screen 25.

The color television system of Figure 2 differs from that of Figure 1 in that there are interposed in the optical path of the system elements 26, 27 and 28 which function to absorb the light not properly collimated or angularly directed with respect to the optical axis of the system.

Thus the light incident on screen 25 at each elemental area thereof contains substantially no light rays except those which are accurately collimated and which derive from the corresponding and homologous elemental area of valves 13, 14 and 15. Briefly, the elements 26, 27 and 28 comprise a structure having a plurality of parallel apertures having light absorbing side walls. They are more fully described in connection with Figures 3 and 4.

Each of the valves 13, 14 and 15 is characterized by the passage therethrough of an increased fraction of the incident light at a particular point upon the imposition of an electric field across the valve at this point. This field may be controlled by appropriate video signals impressed on each electron beam. Thus, assuming that valve 14 transmits the color cyan with incident white light in the absence of an electric field; upon the application of a video signal of sufficient strength upon the impinging electron beam which will cause an electric field to be impressed across the valve at a particular point, the valve will permit the passage of an adequate amount of white light substantially without excessive absorption.

More specifically, color separation signals corresponding to the primary colors of the white spectrum (to wit, red, green, and blue color separation signals) may be derived in conventional manner from the image to be transmitted by means well known in the television art, and the electron guns 16, 17 and 18 may then have impressed upon them the video signals corresponding to the primary colors, red, green and blue. Assume the original image to have a portion which is red without any green or blue. The color separation signal on the beam of valve 14 will have a signal imposing a field across valve 14 at the appropriate elemental areas. Therefore, this valve will transmit white light. However, the electron beams of valves 13 and 15 will have no green or blue color separation signals. Therefore, they will absorb the green and blue portions of white light respectively, and the unabsorbed red light will appear at the appropriate elemental area of the reproduced image. Otherwise phrased, white light, after passage through magenta and xanth filters, will retain red only. To explain the phenomena in a different way, one may say that the red color component of the incident light is transmitted by valve 14 to a degree corresponding to the signal impressed on the electron gun 17 and likewise the green and blue color components by valves 13 and 15 respectively. Signals on the electron beam which produce the desired electric field in each valve and the transmission of light in accordance therewith are fully described in the above cited articles in the Proceedings of the Institute of Radio Engineers, except that it will be understood that the signals to be applied in my tube must correspond at each valve to the intensity of the corresponding color separation; e. g., red, green and blue, respectively, derived from the original image.

Each electron beam from each of the guns 16, 17 and 18 sweeps out a suitable raster across the corresponding screen under the control of well known deflection fields of equal effect in each instance. Not only are the rasters on screens 13, 14 and 15 of the same size, but corresponding portions thereof are aligned and homologous with respect to the collimated light coming from the source 19, so that the light passing through a given elemental area of screen 14 passes through a corresponding elemental area of screens 13 and 15, ultimately to strike on viewing screen 21 and thereby to form a corresponding elemental area of the original image. Thus, the elemental areas on screen 21 conform in color to the color of the corresponding areas of the original image and may be observed by the eye of an observer suitably placed.

Figure 5:
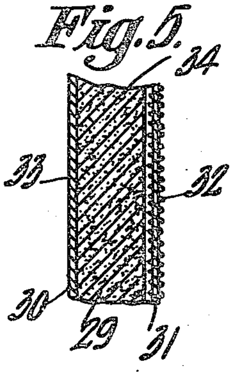
Figure 5 is a sectional view of one of the valves of Figures 1 and 2.

The construction of one of the valves 13, 14 and 15 (say that of valve 14) is shown in enlarged cross-sectional view in Figure 5. A thin layer of liquid 29 is contained between insulating side walls 30 and 31. The total thickness of each valve is preferably less than the dimensions of the area corresponding to that to be resolved in the final image; i. e., less than the scanning spot diameter. A coating of conductive material 32 is placed upon one side of the insulating side wall 31, in this example the outside. A corrective filter, the function of which is explained hereinafter, may be placed as a coating 33 on side wall 30. The liquid 29 contains a suspension of particles 34 which are characterized by the fact that they are plate-like bodies having a dielectric constant greater than that of the liquid. The plate-like particles preferably have a conductive coating on one side thereof so that they may have charges induced thereon permitting deflection in an electric field and may, therefore, be considered conductive or at least to have a dielectric constant much greater than the insulating liquid, that is, sufficiently greater to be considered conductive with respect thereto. These particles align themselves under the stress of an electric field between side walls 30 and 31. Side walls 30 and 31 are preferably substantially transparent to white light and may be clear glass or preferably thin sheets of mica, and the coating 32 is exceedingly thin so that it, too, transmits substantially all the white light incident upon it. It will be apparent, then, that an electric field is impressed extending across the walls and having vectors or components normal to the side walls, white light is freely transmitted through the color control valve 14 by passing between the aligned particles 34. Particles 34, however, when not aligned assume a heterogeneous random orientation, or are deoriented, so that light instead of passing between particles 34 must pass through a great number of them. All the particles 34 in a particular valve are colored to be absorptive of the energy in a fractional portion of the spectrum of substantially white light and to be comparatively transmissive of the energy in a remaining fractional portion of said spectrum. For example, in valve 14 the particles may absorb the red portion, and transmit the green and blue portions (or cyan) of the spectrum of white light. Thus, with white light incident on this valve, the light transmitted through the color control valve at the point where the particles 34 are deoriented, or randomly oriented, will be cyan; whereas light passing through the color control valve at points where the particles are oriented or aligned parallel to the collimated light will be lighter shades of cyan or even substantially white, dependent on the controlled particle orientation, since more of the light then passes between the aligned plate-like particles.

Figure 6:
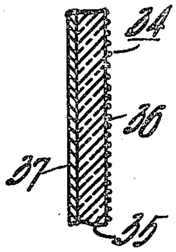
Figure 6 is a sectional view, greatly enlarged, of one of the flakes or plate-like particles which may be used in the liquid suspension of the valve of Figure 5.

Referring to Fig. 6, one of the particles 34 is shown in greatly enlarged cross-section and is formed of a thin sheet of material 35 which has a conductive coating 36 on one side and a coating 37 on the other side which is absorptive of one of the colors so that the transmission characteristic of the element 34 corresponds to one of the chosen component colors. The conductive layer 36 may be substantially transparent to white light and may consist of a thin coating of sputtered, evaporated, or otherwise deposited metallic material. The coating 37 may be a dyed gelatine. Dyed gelatine substances are well known in color photography which have the desired color transmission characteristics. Thus, dyed gelatines are readily available which transmit the colors cyan, magenta, and xanth and absorb substantially all of the corresponding red, green, and blue spectrums of white light. Such dyestuffs, suitable for dyeing gelatine, are commercially available (e. g., for the so-called wash-off relief process of the Eastman Kodak Company at Rochester, New York, United States of America). The particles of transparent material 35 may be glass, mica, or plastic. Again, I may omit coating 37 by appropriately dyeing the glass or plastic 35. Also, I may use other substances for the dyed layer 37 which adheres to the particle, for example, dyed cellulose acetate.

Figure 7:
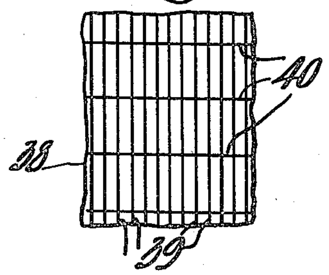
Figure 7 is a view illustrating one step in the process of constructing the flakes of Figure 6.

Referring now to Figure 7, there is illustrated one method of forming the particles 34 of Figures 5 and 6. A sheet of very thin glass or dyed plastic material 38 is ruled by a multiple pointed tool (preferably diamond pointed) which cuts vertical parallel grooves 39. Grooves 40 are likewise ruled horizontally with a second tool having cutting points more widely spaced than the grooves 39. The coating 37 may now be applied if necessary, and the coating 36 by sputtering or evaporation. Then, the sheet can be broken up into flakes or plate-like particles by concussion, bending, heating, or chilling or any combination thereof. The essential characteristic of the shape of these flakes is that they are thin, that is, of a thickness small compared to their other dimensions, as will be apparent from a study of the published article to which reference has been made hereinbefore. These may be termed plate-like particles. I prefer, also, that they be long compared to their width. If desired, the flakes 34 may be sorted by the use of sieves, or by air or liquid settling processes so that only flakes falling within a certain range of dimensions will be accepted and those falling outside those dimensions will be rejected. The size of particles 34 is to be determined by the resolution desired in the final image. The particles are therefore preferably smaller in any dimension than the diameter of the smallest area to be resolved in the final image; i. e., the scanning spot area. Of course, the completed colored conductive particle and the liquid in which it is suspended must not react to deteriorate the particles.

Figure 9:
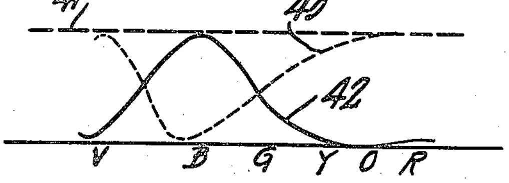
Figure 9 is a graphical representation of the transmission characteristics of a filter which may be employed in conjunction with the tube of Figure 1 or 2 to obtain high fidelity of the color of the final image produced by the tube.

To explain the function of corrective filter 33, reference is made to Figure 9 which shows the color transmission characteristics of such a filter. The abscissae in this figure are generally related to wavelength, the letters V, B, G, Y, O, R referring respectively to the wavelengths of violet, blue, green, yellow, orange, and red light. The ordinates indicate intensity or they may be considered as representing the energy transmitted to the corresponding wavelength. The dashed line 41 represents a neutral gray, whereas the curve 42 represents a color which is to be neutralized by the corrective filter. The curve of the corrective filter 43 is obtained by subtracting the ordinates of curve 42 from the corresponding ordinates of curve 41. In practice the line 41 may lie above the peak of the curve 42 since zero absorption by any actual filter at a wavelength corresponding to the maximum or peak of 42 is not obtainable as a practical matter. A corrective filter designed in this fashion may be incorporated as a layer 33 of color dyed gelatine material to have the absorption characteristics illustrated by the curve 43, whereas the curve 42 is derived from the absorption characteristics of all of the color absorbing components of the color television tube or system prior to the visualization point of the final reproduced image. It is obviously immaterial at what particular point of the system the layer 33 is introduced and it is, of course, understood that it may have a different support than wall 30. In fact, layer 33 may be at any point between the light source 19 and the reproduced image. In other words, the screen 33 will correct for departure of the reproduced image from a direct white or light gray at the points at which a white or light gray should appear. While the light intensity and contrast of the reproduced image may be somewhat reduced, the color fidelity thereof is greatly heightened by the color filter 33.

Figure 8:
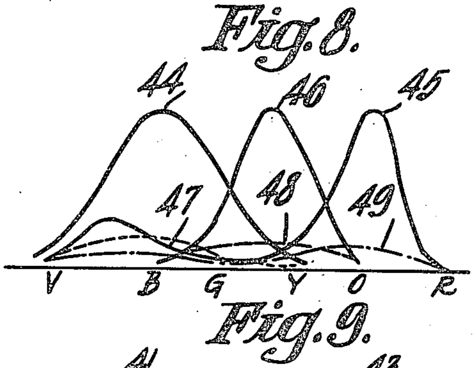
Figure 8 is a graphical representation of the transmission characteristics of each of the three valves of the color subtractive television tube illustrated in Figure 1.

Referring now to Figure 8, there is shown a graph on coordinates similar to those of Figure 9 and in which the curve 45 represents the transmission characteristics of the cyan valve 13, the curve 44, those of the magenta valve 15, and the curve 46 those of the xanth valve 14, in a system such as that illustrated in Figure 1. In other words, the curves 44, 45 and 46 represent, respectively, the transmission characteristics of the light valves 14, 13 and 15 in a partially oriented state in which they are to transmit their respective colored light at considerable intensities. These curves 44, 45 and 46 combined give a curve such as Figure 9. The curves 47, 48 and 49, respectively, represent the residual or minimum color transmission of these same valves when the particles are practically entirely deoriented. These latter curves combined give a curve such as 42 having generally smaller ordinates and perhaps a somewhat different shape than that resulting from combining curves 44, 45 and 46. It will now be seen that in a practical system the curve 42 of Figure 9 should be a compromise calculated in such a way that the filter 44 gives the best correction to produce black and white contrasts on the image of gray subjects reproduced on the screen, since the combined characteristics of the curves 44, 45 and 46 may be somewhat different from the combined characteristics of the curves 47, 48 and 49. It is obvious that the corrective color filter may be interposed at any point in the system between the origin of the collimated light and the reproduced image.

Figure 3 illustrates one form of the optical elements 26, 27 and 28 of Figure 2. Each of these elements has a plurality of internal light passageways 50, the side walls of which are blackened or otherwise treated so that they absorb substantially all of the light radiation impinging upon the side walls and reflect substantially no light. The pasageways are long compared to their cross-sectional dimensions, preferably in a range of ratios of approximately ten-to-one to one hundred-to-one or more. Moreover, the walls of the passageways are substantially parallel to each other and these passageways may be described as having cylindrical or right-prismatic walls, that is, each passageway surface may be considered as generated by a straight line parallel to a fixed straight line generatrix. All of the internal surfaces of the passageways have the same generatrix, in which sense the cylindrical or prismatic passageways are all axially parallel to each other.

Figure 4:
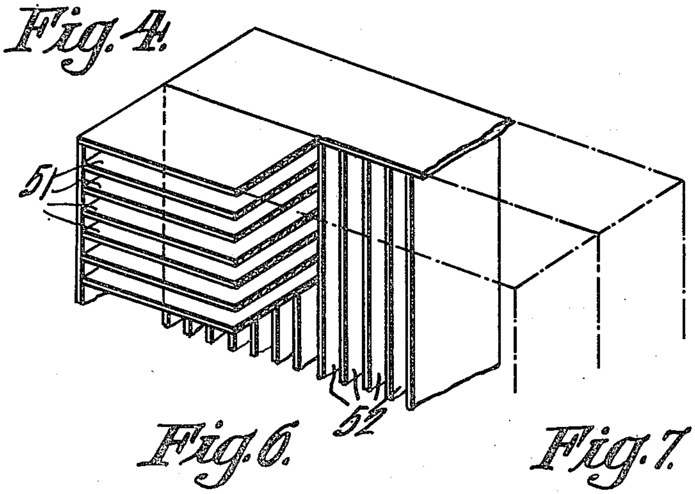
Figure 4 illustrates a modified form of collimating device.

Figure 4 shows another form of the optical element 26, 27 or 28. In view of its function and construction, such an element may be termed a "collimatrix" (Plural: "collimatrices"). In this case, the passageways are formed by a plurality of horizontal parallel plates 51 which are arranged in front of a plurality of vertical parallel plates 52. The combination of these two portions of the element operates to reduce or eliminate deviation from ray parallelism as in the case of the device illustrated by Figure 3.

The practical construction of the elements or devices 26, 27 and 28 ranges as desired. One method of producing these devices is to draw fine tubes of round or square cross section, to cut these tubes into lengths long in comparison to the dimensions of their cross sections, and to stack these tubes in a holder with their axes parallel and the tubes in juxtaposition, thereafter holding them together either by pressure, liquid adhesive or other desired means. Blackening of their interior surfaces can be accomplished, for example, by depositing carbon black thereon or by producing a dark metallic salt on their surface by etching or deposition of any type. The exact method of construction of collimatrices is not relevant to this invention.

Figure 10:
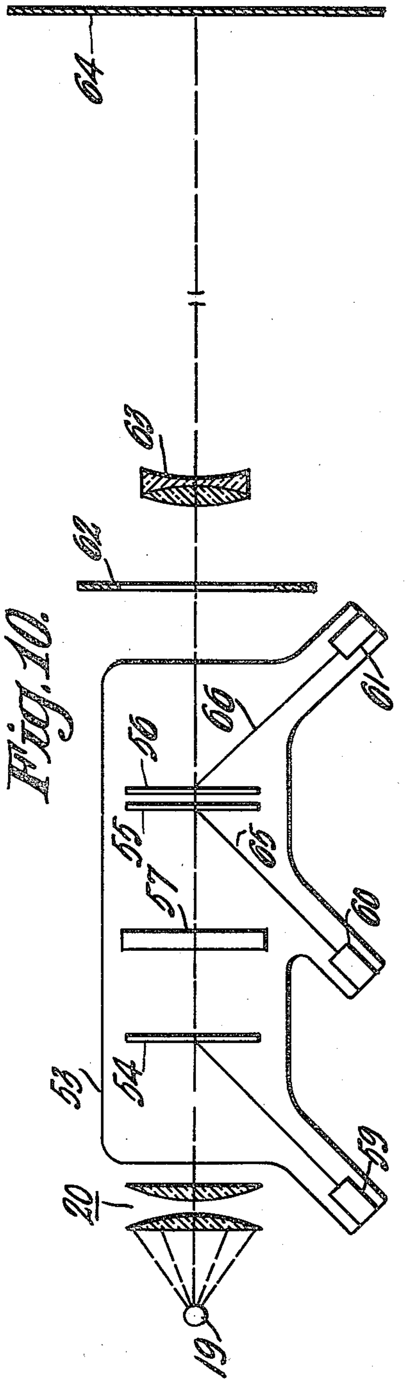
Figure 10 is a cross-sectional schematic view of a third color television system according to the invention which is more compact than the system of Figure 1 and utilizes refractive optics with only two color valves.

The form of color television system illustrated by Figure 10 includes an evacuated receptacle 53, within which are mounted the valves 54, 55 and 56 and a single collimator element 57. Electron guns 59, 60 and 61 are arranged to cooperate with the valves 54, 55 and 56, respectively. The light transmitted through the tube is applied to a ground or diffusing glass screen. The image produced on the screen 62 is projected through a lens 63 to a viewing screen 64. The lens 63 is of achromatic objective type and functions to enlarge the image produced on the screen 64.

It will be noted that the arrangement of Figure 10 differs from those of Figures 1 and 2 in that the valves 55 and 56 are in close juxtaposition and that the scanning beams 65 and 66 impinge from opposite angles with reference to the optical axis of the system. In this case, it is generally desirable to have the target screens 55 and 56 produce the magenta and cyan images and to use the valve 54 for the xanth image. This is because the delineatory powers of xanth are low and hence slight errors in the registration of the xanth image on 54 or in exact collimation of the light beam between 54 and 55—56, will have relatively little effect on the resolution of the final color image. The images formed by 54 and 55 are in close juxtaposition, and therefore the light passing through and between them generally does not require collimation. Similarly, in Figures 1 and 2, the component-color image screens 13, 14 and 15 are preferably respectively for the xanth, magenta and cyan images.

In all cases, the usual keystone-correction systems are to be utilized to overcome the shape distortion resulting from oblique scanning and it is clear that such systems must function identically in the formation of each of the component color images.

Figure 11:
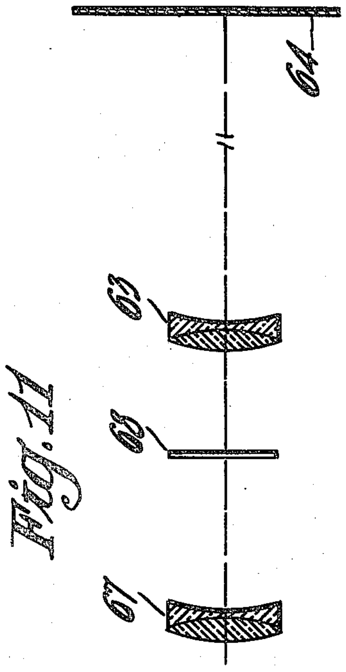
Figure 11 is a view of an optical system which may be used instead of that shown in Figure 10.

As indicated by Figure 11, the screen 62 of Figure 10 may be replaced by an objective lens 67 which forms a sharply focused color at 68. Beyond 68, the second objective lens 63 throws an enlarged erect color image on the white screen 64.

What the invention provides is an improved multi-color picture reproducer including means for projecting collimated light through a plurality of light valves arranged in tandem and each controlled by a different cathode ray to transmit so much light of a different color as is required to form the correct color at each point in the final image.

What I claim is:

1. A light control valve comprising an insulating liquid, plate-like particles in suspension therein and having a dielectric constant greater than that of the liquid, said particles being colored to be absorptive of the energy in a fractional portion of the spectrum of white light and to be comparatively transmissive of the energy in a remaining fractional portion of said spectrum, means to project substantially white light upon said liquid, and means to impress an electric field of varying intensity through said liquid.

2. A light control valve for color television to control transmission of light of a desired fractional portion of the spectrum of substantially white light, comprising an insulating liquid, plate-like particles in suspension therein and having a dielectric constant different from that of the liquid, said particles being long with respect to their cross-sectional dimensions and being colored to be absorptive of the energy in said desired fractional portion of said spectrum and to be comparatively transmissive of the energy in the remaining fractional portion of said spectrum, a container for said liquid having side walls, means to project substantially white light upon one of said side walls, and means to impress an electric field through said liquid between said side walls of an intensity increasing or decreasing with resulting increased or decreased transmission of said desired fractional portion of said spectrum.

3. In a light control valve, an insulating liquid substantially transparent to white light, plate-like particles in suspension therein, said particles having a color coating on one side absorptive of the energy in a fractional portion of the spectrum of substantially white light and comparatively transmissive of the energy in a remaining fractional portion of said spectrum and having a substantially transparent conductive coating on the other side, means to project substantially white light upon said liquid, and means to impress an electric field through selected portions of said liquid.

4. In a light control valve, an insulating liquid, plate-like particles in suspension therein, said particles having a coating on one said side of a strongly dyed adhesive film absorptive of a spectrum corresponding substantially to the spectrum of one of the primary colors and comparatively transmissive of the spectrum of the other primary colors, and on the other said side a conductive substantially transparent coating, means to project substantially white light upon said liquid, and means to impress an electric field through said liquid.

5. A light control valve comprising, insulating liquid, a plate-like particle of transparent insulating material, and having two substantially flat sides, a coating on one of said sides of an adhesive film dyed to be absorptive of the energy in a fractional portion of the spectrum of substantially white light, and to be comparatively transmissive of the energy in a remaining fractional portion of the spectrum of said light, and a conductive substantially transparent coating on the other of said sides, means to project substantially white light upon said liquid, and means to impress an electric field of varying intensity through different portions of said liquid.

ALFRED N. GOLDSMITH.

References Cited in the file of this patent

UNITED STATES PATENTS

| Number | Name | Date |
|---|---|---|
| 1,176,313 | Pfund | Mar. 21, 1916 |
| 1,438,013 | Benson | Dec. 5, 1922 |
| 1,870,017 | Wichelssen | Aug. 2, 1932 |
| 1,955,923 | Land | Apr. 24, 1934 |
| 1,963,496 | Land | June 19, 1934 |
| 2,109,540 | Leishman | Mar. 1, 1938 |
| 2,242,317 | Metcalf | May 20, 1941 |
| 2,330,172 | Rosenthal | Sept. 21, 1943 |
| 2,332,220 | Harshberger | Oct. 19, 1943 |
| 2,350,892 | Hewson | June 6, 1944 |
| 2,386,074 | Sziklai | Oct. 2, 1945 |
| 2,387,243 | Castor | Oct. 23, 1945 |
| 2,480,848 | Geer | Sept. 6, 1949 |
| 2,481,621 | Rosenthal | Sept. 13, 1949 |
| 2,493,200 | Land | Jan. 3, 1950 |
| 2,522,531 | Mochel | Sept. 19, 1950 |
| 2,528,510 | Goldmark | Nov. 7, 1950 |
| 2,543,793 | Marks | Mar. 6, 1951 |